(12) United States Patent
Roberts

(10) Patent No.: US 9,592,976 B2
(45) Date of Patent: Mar. 14, 2017

(54) SYSTEM FOR SINGLY DISPENSING FIBROUS FILTERS FROM BULK

(71) Applicant: Coffco, LLC, St. Paul, MN (US)

(72) Inventor: Jeffrey G. Roberts, St. Paul, MN (US)

(73) Assignee: Coffco, LLC, St. Paul, MN (US)

( * ) Notice: Subject to any disclaimer, the term of this patent is extended or adjusted under 35 U.S.C. 154(b) by 0 days.

(21) Appl. No.: 15/043,798

(22) Filed: Feb. 15, 2016

(65) Prior Publication Data

US 2016/0159593 A1 Jun. 9, 2016

Related U.S. Application Data

(60) Division of application No. 13/768,105, filed on Feb. 15, 2013, now Pat. No. 9,290,343, which is a continuation-in-part of application No. 13/546,816, filed on Jul. 11, 2012, now Pat. No. 9,290,342, which is a continuation-in-part of application No. 13/107,621, filed on May 13, 2011, now abandoned.

(60) Provisional application No. 61/358,299, filed on Jun. 24, 2010, provisional application No. 61/372,291, filed on Aug. 10, 2010.

(51) Int. Cl.

| B65H 3/56 | (2006.01) |
|---|---|
| A47J 31/08 | (2006.01) |
| B65H 3/22 | (2006.01) |
| B65H 1/00 | (2006.01) |
| A47K 10/44 | (2006.01) |

(52) U.S. Cl.
CPC ............ B65H 3/56 (2013.01); A47J 31/08 (2013.01); B65H 1/00 (2013.01); B65H 3/22 (2013.01); A47K 10/44 (2013.01)

(58) Field of Classification Search
CPC ... B65H 3/32; B65H 3/22; B65H 3/56; B65H 1/00; B65B 69/0041; A47F 1/065; A47F 1/106; A47K 10/44; A47J 31/08; A47J 31/085
USPC ................................. 221/26, 30, 36, 41, 213
See application file for complete search history.

(56) References Cited

U.S. PATENT DOCUMENTS

| 2,112,959 A * | 4/1938 | Harvey .................... B65D 5/72 206/499 |
|---|---|---|
| 2,638,211 A | 7/1951 | Spurr |

(Continued)

OTHER PUBLICATIONS

Printout from website, "www.campingworld.com", Coffee Filter Dispenser, Catalog Item #47880 (2 pages), printed Apr. 8, 2010.

(Continued)

*Primary Examiner* — Michael K Collins
(74) *Attorney, Agent, or Firm* — Shumaker, Loop & Kendrick, LLP

(57) ABSTRACT

A system for singly dispensing fibrous coffee filters from bulk includes a grasping tool having a handle with a working end and a container with an edge trim member for preventing bulk fibrous filters from passing freely through the opening in the container. The edge trim member comprises interlocking parts and has a planer platform for rotating the trim member relative to the container. The planer platform has a cutout extending therethrough. The handle of the grasping tool is configured to be releasably secured to the platform. The system accommodates large and small cup- and cone-style filters and may be built-in to a coffee brewing machine.

11 Claims, 13 Drawing Sheets

(56) References Cited

U.S. PATENT DOCUMENTS

| | | | |
|---|---|---|---|
| 2,885,290 A * | 5/1959 | Krasker | A47J 31/02 |
| | | | 426/433 |
| 3,065,878 A | 11/1962 | Behrens | |
| 3,094,323 A | 6/1963 | Catania | |
| 3,180,383 A | 4/1965 | Nudell | |
| 4,093,297 A | 6/1978 | Reiber | |
| 4,121,726 A * | 10/1978 | Pemberton | A47J 31/08 |
| | | | 221/213 |
| 4,155,484 A | 5/1979 | Pastore | |
| 4,214,673 A | 7/1980 | Heath et al. | |
| 4,266,665 A | 5/1981 | Nelson | |
| 4,415,079 A | 11/1983 | Ackeret | |
| 4,522,298 A * | 6/1985 | Weinberger | B65D 25/20 |
| | | | 206/216 |
| 4,585,145 A | 4/1986 | Pitroda | |
| 4,592,840 A | 6/1986 | Brooks | |
| 4,600,227 A | 7/1986 | Ennis et al. | |
| 4,629,092 A | 12/1986 | English | |
| 4,629,236 A | 12/1986 | Smith | |
| 4,667,996 A | 5/1987 | Gaspar | |
| 4,674,635 A | 6/1987 | Huldin et al. | |
| 4,676,396 A | 6/1987 | Mamolou | |
| 4,739,902 A | 4/1988 | Joslyn et al. | |
| 4,796,779 A | 1/1989 | Mamolou | |
| 4,805,801 A | 2/1989 | Knopf | |
| 4,832,845 A | 5/1989 | Hendretti | |
| 4,865,737 A | 9/1989 | McMichael | |
| 4,874,112 A | 10/1989 | Mulder et al. | |
| 4,905,870 A | 3/1990 | Mamolou | |
| 4,913,312 A | 4/1990 | Boutin | |
| 5,097,984 A | 3/1992 | Meisner et al. | |
| 5,197,630 A | 3/1993 | Kirla | |
| 5,252,211 A | 10/1993 | Searfoss, Jr. | |
| 5,687,876 A | 11/1997 | Lucas, Jr. | |
| 5,833,286 A | 11/1998 | Means | |
| 5,865,095 A * | 2/1999 | Mulle | A47J 31/0573 |
| | | | 99/286 |
| 5,924,563 A * | 7/1999 | Salyers | A47J 31/08 |
| | | | 206/216 |
| 6,170,697 B1 | 1/2001 | Sarris | |
| 6,250,696 B1 | 6/2001 | Baker | |
| 6,464,271 B1 | 10/2002 | Irvin, Jr. | |
| 6,497,818 B1 | 12/2002 | Bunn | |
| 6,688,490 B2 | 2/2004 | Carlson | |
| 6,789,694 B1 | 9/2004 | McCullough | |
| 6,805,042 B2 * | 10/2004 | Mordini | A47J 31/06 |
| | | | 99/295 |
| 7,093,530 B2 * | 8/2006 | Meister | A47J 31/0647 |
| | | | 99/295 |
| 7,137,419 B1 * | 11/2006 | Reeves | B01D 29/085 |
| | | | 141/340 |
| 7,490,880 B1 | 2/2009 | Matsui | |
| 7,640,851 B2 * | 1/2010 | Blair | A47J 31/007 |
| | | | 141/165 |
| 8,221,623 B2 | 7/2012 | Zhong | |
| 9,108,794 B2 | 8/2015 | Fu | |
| 9,144,343 B2 * | 9/2015 | Oh | B65D 85/8043 |
| 2009/0056557 A1 | 3/2009 | Lin | |
| 2010/0282091 A1 | 11/2010 | Doleac | |
| 2011/0117248 A1 | 5/2011 | Rivera | |
| 2012/0058226 A1 | 3/2012 | Winkler | |
| 2012/0321748 A1 * | 12/2012 | Otto | A47J 31/06 |
| | | | 426/80 |
| 2015/0296827 A1 * | 10/2015 | Cross | B65D 85/8043 |
| | | | 426/108 |

OTHER PUBLICATIONS

Printout from website, "www.amazon.com", Camco 43653 RV Coffee Filter Dispenser, (5 pages), printed Apr. 8, 2010.
Printout from website, "www.hannarvandtrailers.com", "Pop-A-Filter Coffee Filter Dispenser" (1 page), printed Apr. 8, 2010.
Printout from webisite, "www.dyersonline.com", "Coffee Filter Dispenser", Item #22951 (1 page), printed Apr. 8, 2010.

* cited by examiner

SYSTEM FOR SINGLY DISPENSING FIBROUS FILTERS FROM BULK

REFERENCE TO RELATED APPLICATION

This is a division of U.S. application Ser. No. 13/768,105, filed Feb. 15, 2013, which is a continuation-in-part application of U.S. application Ser. No. 13/546,816, filed Jul. 11, 2012, which itself is a continuation-in-part application of U.S. application Ser. No. 13/107,621, filed May 13, 2011, which claims priority to U.S. Provisional Application Nos. 61/372,291, filed Aug. 10, 2010 and 61/358,299, filed Jun. 24, 2010, each of which is hereby incorporated by reference.

BACKGROUND OF THE INVENTION

1. Field of the Invention

The invention relates generally to containers and methods for dispensing articles and, more particularly, to a system for singly dispensing fibrous filters from bulk.

2. Description of the Prior Art

Coffee filters typically cling together when in bulk quantities. It is well known, however, that the filters must be singly placed into a brewing machine for the desired result, and separating the filters to obtain a single filter can be difficult. If two or more filters are mistakenly used, coffee and water may flood over the top of the filter basket causing a mess and/or damage to the machine. Another problem is that manipulating the filters by hand is difficult and spreads germs.

It is also known to use tools that improve one's ability to grasp and separate the filters. Such tools, however, are typically connected in some way to the paper box of filters. In addition to adding manufacturing costs to the filter box, these tools have complicated folding linkages connecting them to the box. This helps prevent the tool from being separated from the box; but hinges and linkages limit the range of motion of the tool and/or require extreme dexterity to manipulate. Also, such connective hinges often tear or otherwise fail since they are perforations and folds formed in the paper box.

Other such tools employ adhesive means for grasping the filter. Such adhesive surfaces loose their adhesion through repeated use as paper particles accumulate on their surfaces. Thus, prior bulk coffee filter separating systems eventually fail.

There is, therefore, a need for a new system for singly dispensing fibrous filters from bulk. A system capable of protecting the filters from damage caused by water/coffee spillage is also desirable.

SUMMARY OF THE INVENTION

The disadvantages heretofore associated with the prior art are overcome by the inventive system for singly dispensing fibrous filters from bulk. When compared with previous filter dispensing methods, the inventive system provides advantages, including an efficient and easy way to store and singly dispense coffee filters from bulk.

In one aspect of the invention, a grasping tool with a working end and a container with an opening are provided. The opening includes an edge. At least a portion of the edge or an edge trim member may be shaped so that bulk fibrous filters cannot pass freely through the opening in the container when contained therein, and so that at least a portion of a top filter is accessible and graspable by the working end of the grasping tool. A cover is provided for covering the filters to keep them clean and dry.

In another aspect, the edge trim member is releasably secured to the container. The edge trim member has a downwardly extending wall with a Z shaped cross section and tab members extending inwardly from the wall. The edge of the opening of the container has cutouts for receiving the tab members. The tab members can pass freely through the cutouts so that the edge trim member and the tab members can rotate freely relative to the container to define a locked position with the tab members underneath the edge of the opening. The edge trim member includes a planer handle with a cutout for releasably receiving the handle of the pick tool.

In another aspect, the opening is in the form of an elongate slot extending along the width of a side of the container. The fibrous filters may be cone type filters, and the slot has an enlarged portion.

In another aspect, the opening is in the form of a circle located centrally in a side of the container. The fibrous filters may be basket type filters, and the opening has an inwardly-sloped peripheral edge.

In yet another aspect, the grasping tool includes a handle. The working end of the grasping tool may define a pick, which extends outwardly from the handle.

In still another aspect, at least a part of the handle or a portion of the container is magnetic so that the handle can be releasably connected magnetically to the container.

One object of the invention is to provide an improved system for singly dispensing fibrous filters from bulk. Other objects and advantages of the invention will be apparent from the following description.

BRIEF DESCRIPTION OF THE DRAWINGS

The details of the invention, both as to its structure and operation, may be obtained by a review of the accompanying drawings, in which.

DETAILED DESCRIPTION OF INVENTION

Figure 1:
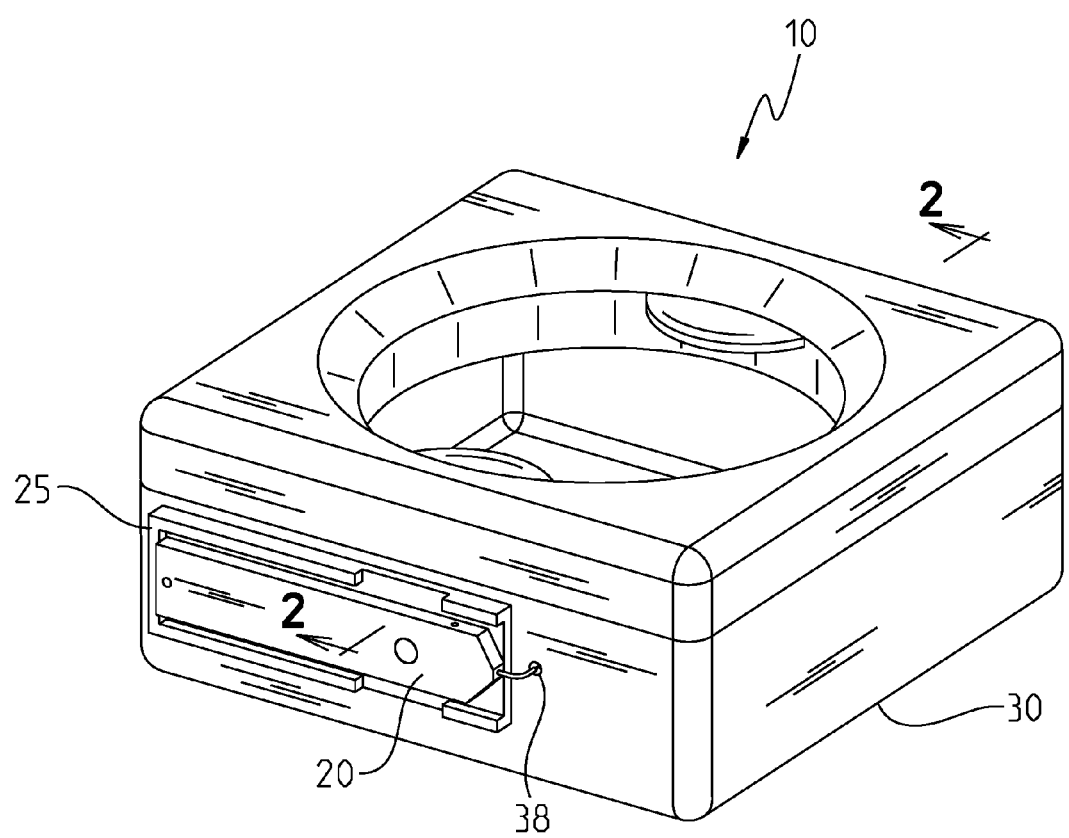
FIG. 1 is an elevated perspective view of an embodiment of the system of the invention.

The present invention pertains to a tool for separating thin layer items made of fibrous or sheer material, such as, coffee filters, from a bulk of such items, in such a manner that only one item is removed at a time. For example, the present invention can be used to separate basket-type and cone-type coffee filters from their nested and stacked bulks, respectively. Other examples include, paper plates, Styrofoam plates, plastic plates, cocktail napkins, and polymeric materials such as plastic grocery and/or trash bags. The preferred embodiment relates to a system for separating coffee filters, particularly of the cup basket and cone types.

Referring to FIGS. 1-6, in one embodiment, the system 10 includes a grasping tool 20 with a working end 22. In an embodiment, grasping tool 20 comprises a handle 12. In some embodiments, at least a portion of the handle is made of metal and may be magnetized. In one embodiment, the working end of the tool bears a shaft that diverges at an angle in the range of from about 80 to 100 degrees, culminating in a sharp pick (tine) 24.

The handle can comprise one or more materials including metals and metallic materials, polymeric materials such as polypropylene, polyurethane, polyethylene, tetrafluoroethylene, and other synthetic materials. The materials can be molded or compressed together in an adhesive, if desired. The handle can comprise non-synthetic or natural materials such as for example, cellulosic materials, examples of which include cardboard, reinforced cardboard, wood, layered or composite wood products, compressed cellulosic fiber such as compressed wood fibers, and the like. Preferred are synthetic materials that have a flexibility such that the handle can moderate forces exerted thereon such that the pressure at the tip of the pick is not so great that a person of average strength would consistently separate groups of more than one membrane from the bulk pack. Thus, the shape and flexibility of the handle can be instrumental in securing it to the container 30 and in moderating the force applied by the user such that the pick separates only one filter from the bulk pack. Polymeric materials are preferred, but other materials that have the same or similar mechanical properties described herein may be used to form grasping tool 20.

Figure 15:
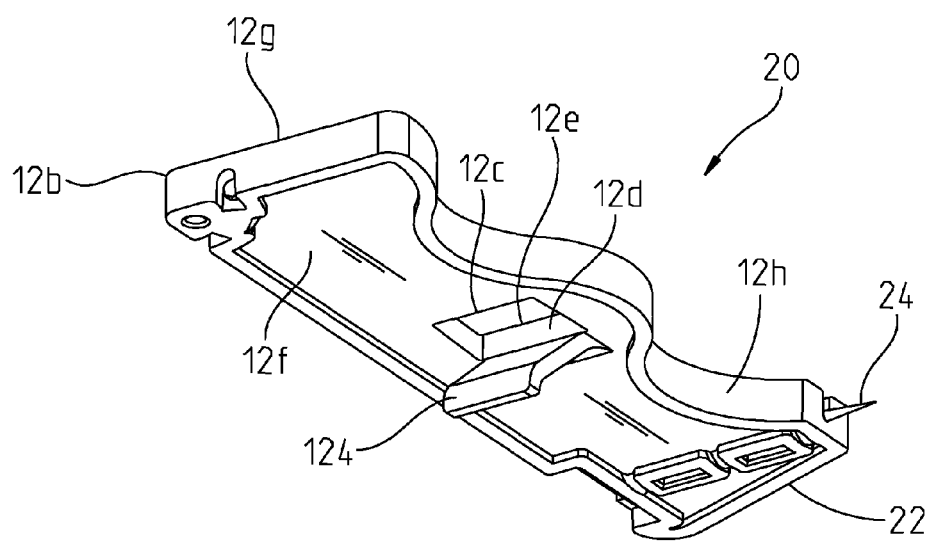
FIG. 15 is an enlarged view of an embodiment of the grasping tool of the invention.

The handle 20 can comprise a layered structure of one or more different materials or veneers, such that the flexibility can be engineered to suit the expected task. While most embodiments provide for a handle having a major axis which is at least about twice the length of the minor axis, in some embodiments, the handle may be designed to be "pinched" between thumb and forefinger, rather than grasped with the entire hand. In such "pinch embodiments (not shown), the handle may be shaped like a tab, i.e., smaller and more compact than the long embodiment described above, for example of a circular or oval shape. In further embodiments, the construction can include the same elements as those listed above for the long embodiment. Handle 12 may also be shaped to accommodate grasping by a user's fingers, as shown in FIG. 15.

In yet another embodiment the handle is magnetized. If desirable, the handle itself can be made magnetic by the use of magnetized materials, such as magnetic dusts which can be embedded into synthetic materials. In another embodiment, a bulk or veneer permanent magnet can be mounted on the handle or embedded in the handle. A magnetized handle enables regular storage, ensuring that the implement will not become separated from the container and lost. The handle may be tethered (not shown) to the container 30 or edge trim member 46 as well in order that it not become separated therefrom.

Figure 5:
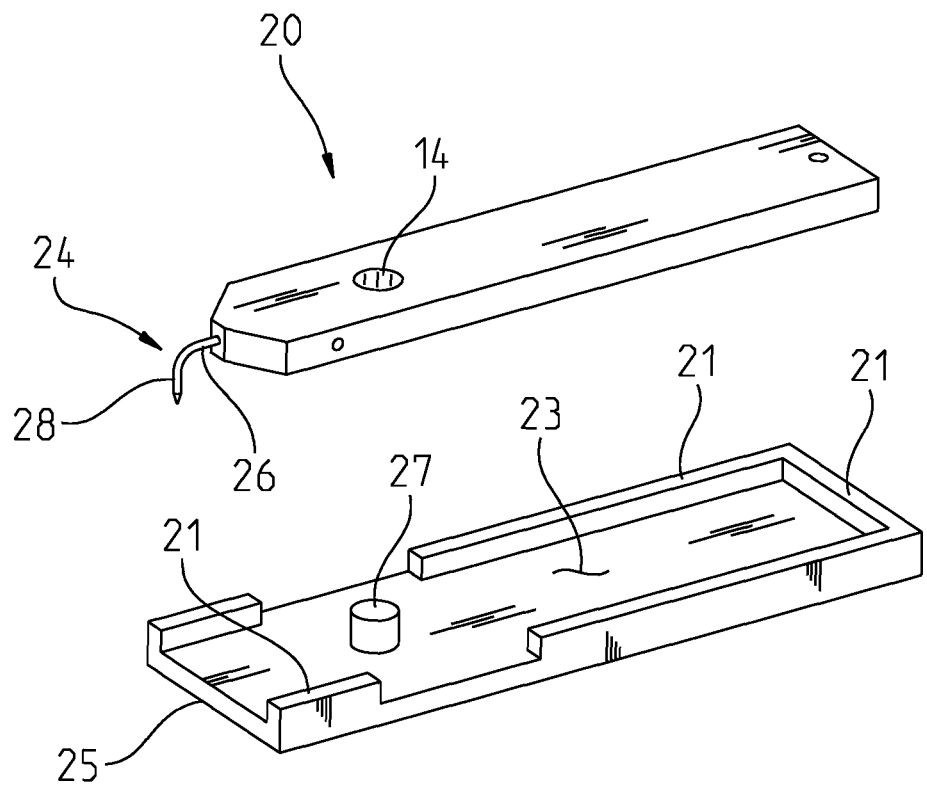
FIG. 5 is a perspective view of an embodiment of the grasping member and base of the invention.

In still another embodiment, the handle comprises a retainer base 25 having a bottom 23 and three upstanding walls 21, as shown in FIG. 5. A post 27 extends upwardly from the bottom. The handle of the grasping tool includes a bore 14 formed therein. The bore receives the post, and the walls contain the grasping tool in the stowed position shown in the embodiment of FIG. 5. Note that the walls 21 are interrupted so that the user can grasp the body of the handle 12 accordingly. Those skilled in the art should appreciate that the retainer base 25 may be adhered or otherwise connected to container 30 using known means, including magnetic, adhesive, fastener, or the like. In other embodiments, like the one of FIG. 1, retainer base 25 may be integrally cast with the body of the container 30 or a coffee maker, for example.

In an embodiment, the working end comprises a pick 24 in the shape of an L. The shaft or leg 28 of the L is approximately one inch long, of which approximately 3/16 inch diverges at an approximately 90 degree angle from the handle to define a stem portion 26. In a further embodiment, the grasping tool comprises an adhesive strip or veneer, comprising double-sided adhesive (not shown), having the ability to hold fast to surfaces, for convenience and storage before and after use. The adhesive strips may include a plurality of stacked "peel-away" strips each being removed and disposed to expose another.

Figure 6:
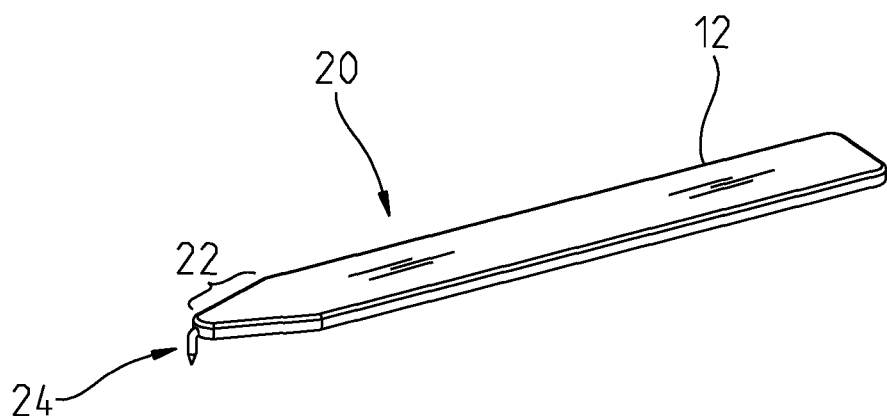
FIG. 6 is a perspective view of another embodiment of the grasping tool of the invention.

The grasping tool 20 comprises a handle 12 and a pick 24 extending away from the handle. The handle is generally elongated, having a major axis which is in the range of from about 2 times to 25 times the length of the minor axis. The handle is preferably of a thickness such that a measure of flexibility is achieved. The handle may be flattened. In one embodiment, the handle is tapered at the pick-bearing end, as shown in FIG. 6.

In an embodiment, the pick is at an angle to the handle in the range of from about 80 to 100 degrees, with an angle in the range of from about 87 to about 93 degrees preferred so as to form an L shape. The pick can extend at such an angle directly from the handle, or in other embodiments, the pick can extend from the handle at another angle, curving along its length such that the tip is at the preferred angle to the handle, and/or the handle has a "curved" shape that is complementary to the shape of fingers. The tip can ultimately be sharply or smoothly bent. In one embodiment, the stem 26 of pick 24 is embedded for part of its length in the handle, as shown in FIG. 5.

The pick preferably comprises a metallic or polymeric material. Metal is preferred for more durable applications, such as long term use in a commercial setting. Plastic or synthetic materials are suitable for applications which are of limited duration, such as for use in residential sized boxes which contain a relatively reduced number of filters.

The types of fibrous membranes which can benefit from the present inventive pick include membranes used in filtration apparatus such as in chemistry and food science. Especially preferred are coffee filters, including all types, but especially applicable to basket-type and cone-type filters, as shown in the drawings.

The pick is easily used with containers comprising folded plastic or metal springs which bias the filters toward an opening. In one embodiment, the membranes 60 are nested basket-type filters, and the opening 40 is in the form of a circle located centrally in the top 32 of a container 30 having the cylindrical symmetry of the filters, as shown in FIG. 1. The filters are biased toward the opening in their upright or upside-down configuration. The filters are removed singly by applying the pick across the accessible surface of the top filter 61 such that the pick element contacts and grasps the filter at approximately a right angle, although other angles will demonstrate a degree of efficiency as well.

Figure 3:
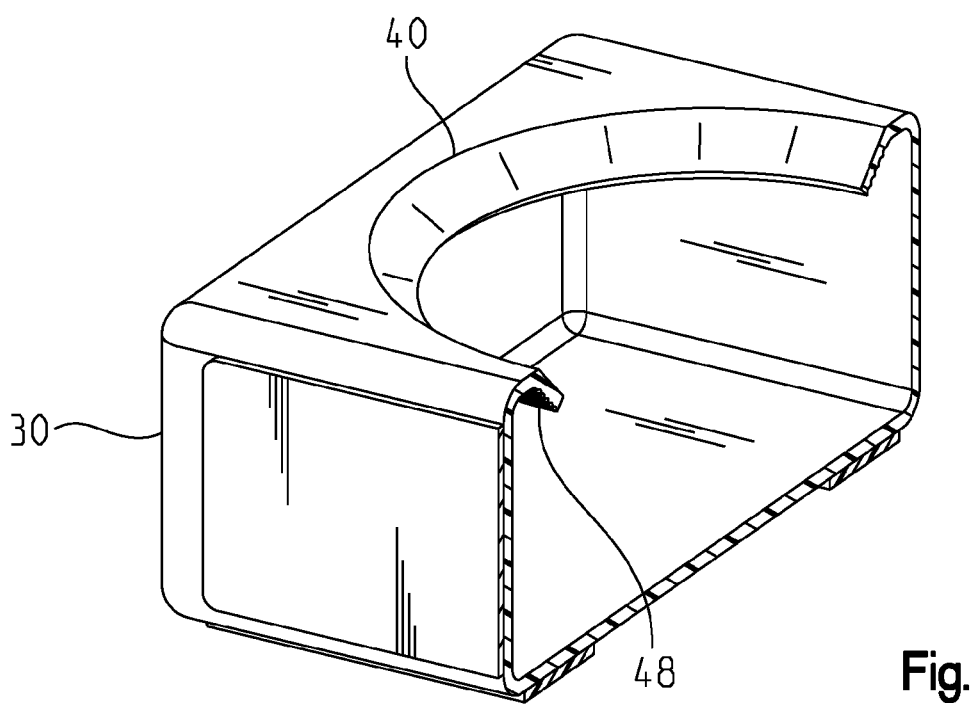
FIG. 3 is a cross sectional perspective view of another embodiment of the container of the invention showing the trim member.

In one example, a suitable container 30 for nested basket type filters is a plastic box-shaped container measuring approximately 6×6×2.5 inches with a round opening 40 located centrally in a top 32 of the container. In one embodiment, the exterior perimeter of the opening contains a small plastic lip or inwardly sloped peripheral edge 42 that inverts ½ inch toward the interior of the opening, its interior edge being serrated at 48, as shown in FIG. 3. In other embodiments, its interior edge is non-serrated. The center cutout is designed to hold an insertion of a stack of basket type bulk coffee filters. In those embodiments having a serrated edge, the serrated edge holds fast to the outermost (last) filter, while not impeding the withdrawal of other filters from the top of the stack.

Figure 4A:
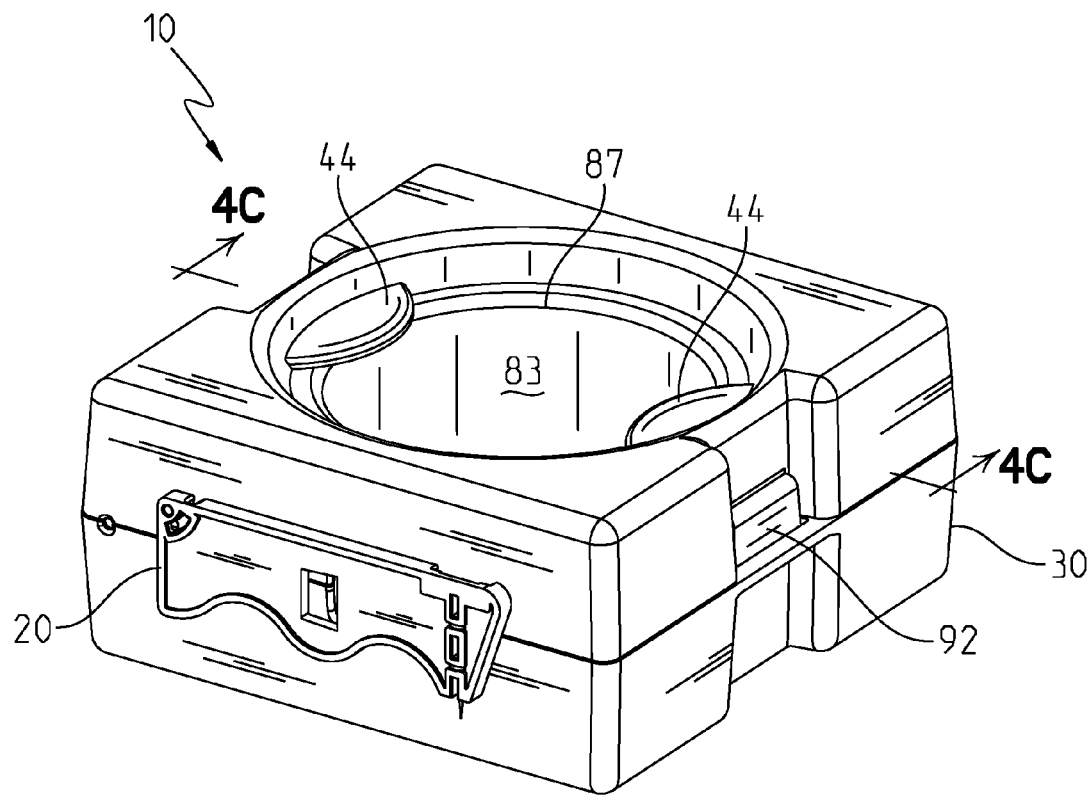
FIG. 4A is an isometric view of another embodiment of the system of the invention showing a four-piece container construction.
Figure 4C:
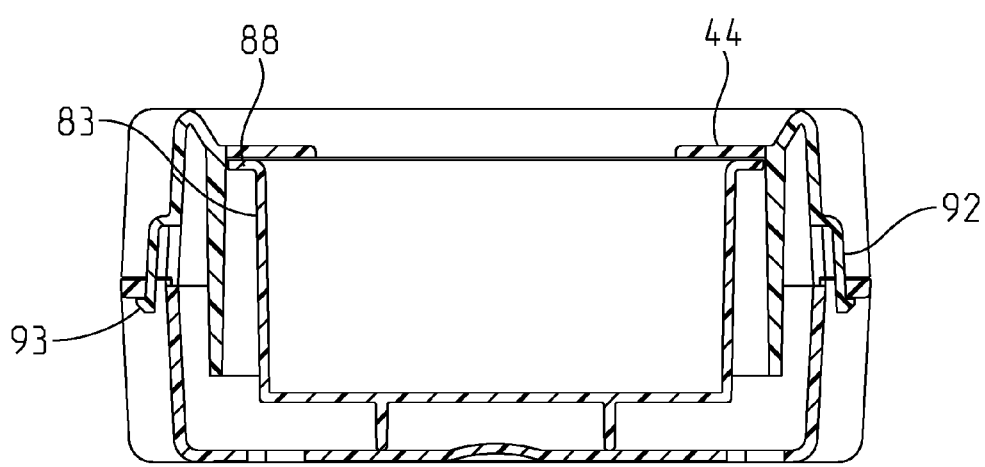
FIG. 4C is a cross section of the system of the invention shown in FIG. 4A taken along line 4C-4C of FIG. 4A.
Figure 4B:
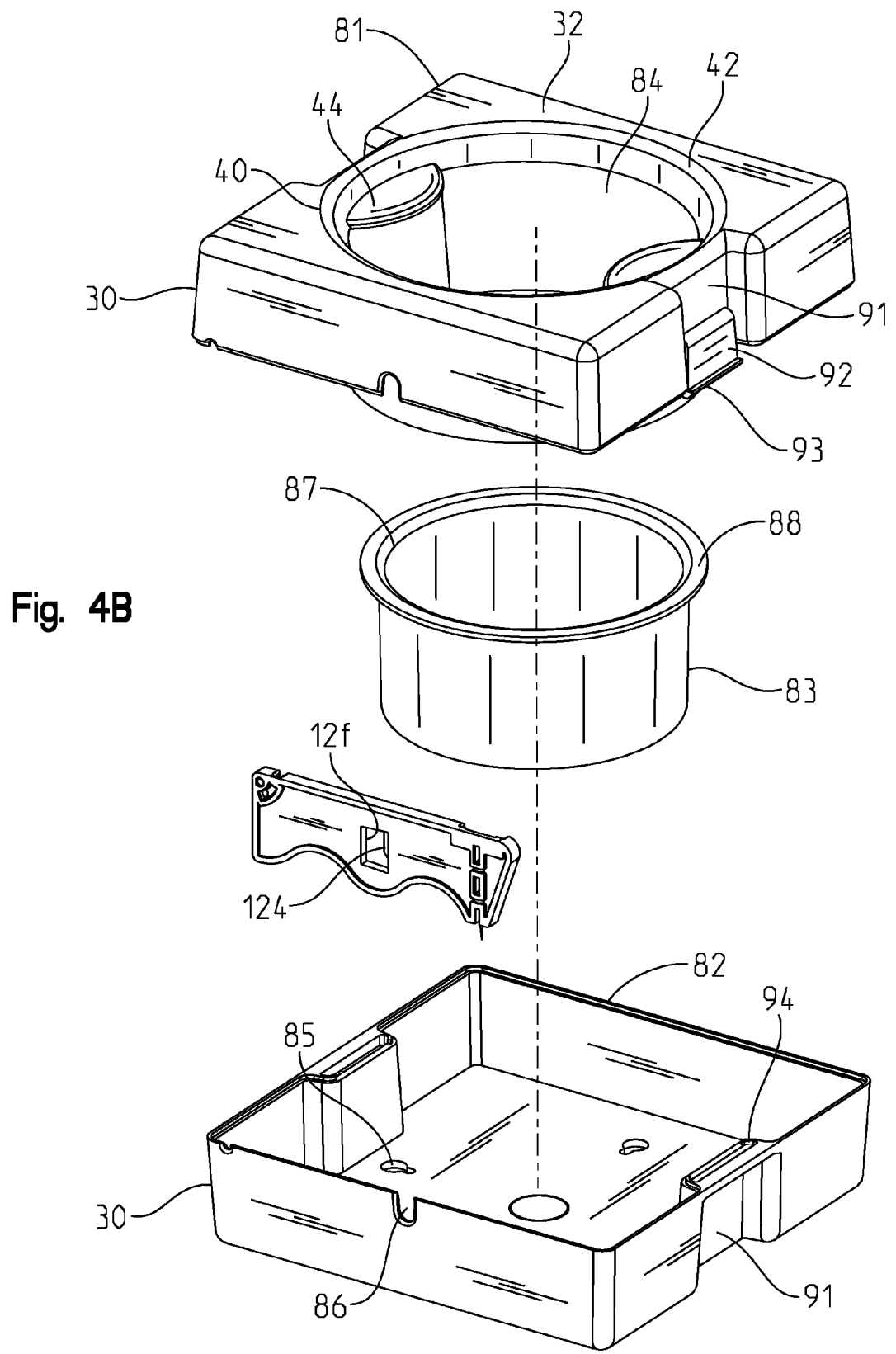
FIG. 4B is an exploded view of the system of invention shown in FIG. 4A.

In another embodiment, smaller filter sizes can be accommodated by including a separate cup 83 designed for insertion into the center cutout, as shown in FIGS. 4A-4C. In this embodiment, a suitable container 30 is a plastic box-shaped container measuring approximately 6¼×6¼×3 inches. The container comprises a top portion 81, a bottom portion 82, and a cup 83. The top portion contains a round opening 40 located centrally in a top surface 32. The opening and the cup are designed to hold an insertion of a stack of basket type bulk coffee filters. The opening accommodates a large-size filter and the cup a smaller one. The exterior perimeter of the opening 40 contains a plastic lip or inwardly sloped peripheral edge 42 that inverts ½ inch toward the interior of the opening. An edge trim sidewall 84 extends downwardly approximately 2 inches from the sloped peripheral edge. Two oppositely disposed tabs 44 extend from the edge trim sidewall toward the interior of the opening to prevent the bulk filters from passing freely through the opening.

The bottom portion of the container may optionally contain elongated holes 85 on the bottom surface to facilitate convenient mounting and storage of the container. The elongated holes are wider at one end to accommodate the head of a nail, screw, or other fastener. The bottom portion may also include a notch 86 in one of the sidewalls designed for receiving a tongue 124 on the grasping tool, as shown in FIG. 15. The tongue is securely positioned within the notch, and the tongue continuously urges the bottom surface 12f of the grasping tool against the exterior sidewall of the container 30 so that a force is provided by the tongue that is distributed about the planar exterior sidewall to maintain the grasping tool on the container. This ensures that the grasping tool does not become accidentally separated from the container.

With reference to FIGS. 4B-4C, the cup contains a rounded mouth or opening 87 and a plastic lip 88 that extends outward from the sidewall of the cup 83 away from the opening. The cup 83 is sized such that it fits entirely within the container 30 when the top and bottom portions 81, 82 are assembled, as shown in FIG. 4A. Additionally, the outer diameter of the plastic lip 88 fits concentrically and securely within the edge trim sidewall of the top portion such that there is little or no movement of the cup when the container is assembled. The tabs 44 prevent the cup from passing freely through the opening. The advantage of the three-piece container construction is that varying filter sizes can be accommodated by varying the cup size. With a smaller cup, for example, the plastic lip 88 may extend further from the cup sidewall such that the plastic lip still maintains a concentric and secure fit within the edge trim sidewall.

Two oppositely disposed recesses 91 are located on the exterior sidewalls of both the top and bottom portions of the container. Within each of the recesses on the top portion is a resilient latching tab 92 with a first end attached to the container and an unattached second end that slopes downwardly away from the top surface 32. The latching tabs 92 contain a raised portion 93 at the unattached second end for locking into a mating slot 94 on the bottom portion 30 of the container. This snap-fits the top and bottom together to form a unitary container 10. The container may be removed from its bottom portion by depressing the tabs to gain access to the cup to refill it with filters.

In an embodiment, the exterior back of the container may comprise strips of double-sided adhesive (not shown) attached to the exterior sides of the back, with the exterior of the strips being clad in a light covering or film for removal prior to installation (use). The adhesive allows the invention to be affixed to flat surfaces, such as the inside of a cupboard door, side panel or cupboard, or counter top or wall, for example. The purpose of the metal strip is to attract and hold the magnetized pick in place. All of these elements together assure convenient relocation of the pick after use, attractiveness, and easy location of both filters and pick when needed.

Figure 2:
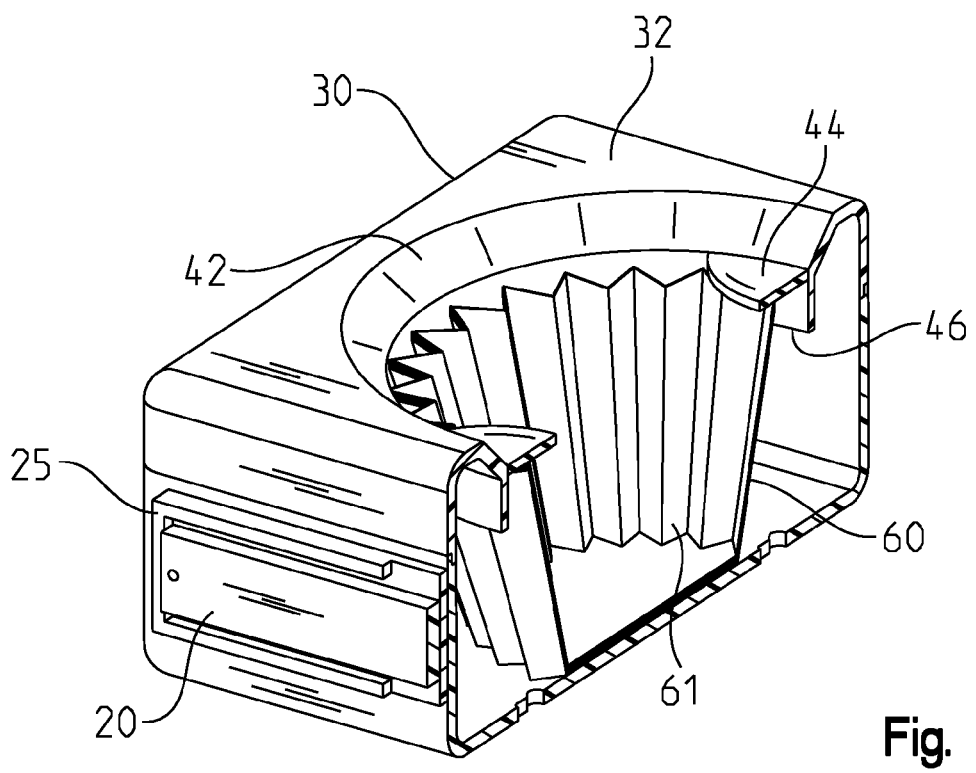
FIG. 2 is a cross section of the embodiment of FIG. 1 taken along lines 2-2.

Another embodiment includes an edge trim member 46. Referring to FIG. 2, for example, the edge trim member 46 extends downwardly from the sloped peripheral edge 42. In the preferred embodiment, at least a portion of the edge 42 or edge trim member 46 is shaped so that the bulk filters cannot pass freely through the opening in the container when contained therein, and so that at least a portion of a top filter 61 is accessible and graspable by the working end of the grasping tool. A pair of oppositely disposed tabs 44, for example, extends from the trim member in an exemplary embodiment and serves to prevent the bulk filters from passing freely through the opening. Skilled artisans will note that other shapes may be employed as described to retain the filters in the container so long as the shape of the edge 42 or trim member 46 results in a portion of the opening having a smaller inner diameter than the outer diameter of the filters when the filters are not deformed.

Figure 7:
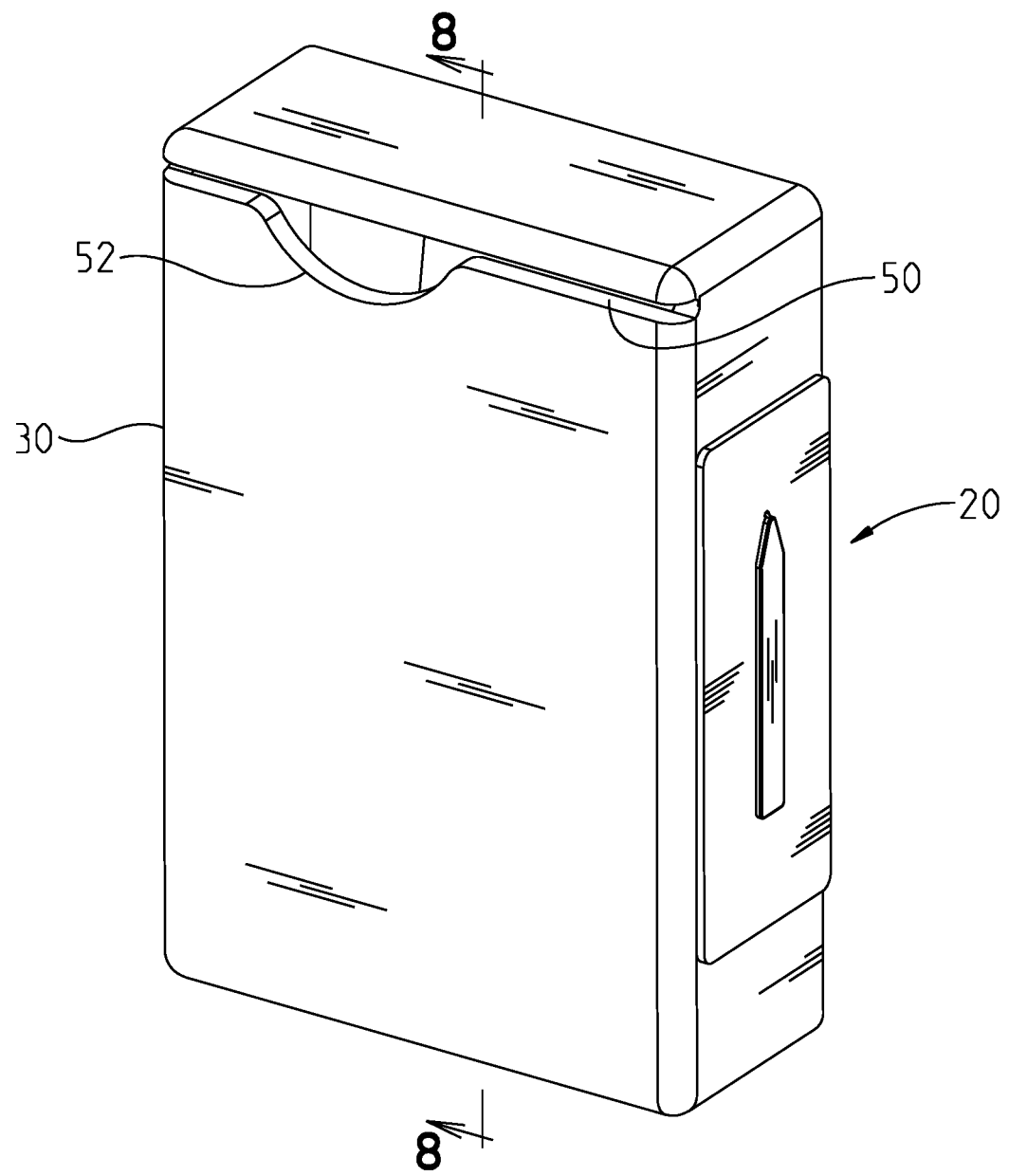
FIG. 7. is a perspective view of another embodiment of the container of the invention useful for singly dispensing cone-shaped fibrous filters.

In another embodiment shown in FIG. 7, the filters (not shown) are flattened cones which, during intended operation, open out into a three-dimensional cone. In this embodiment, the filters are paired with a container 30, as shown, having an elongate cutaway or slot 50 extending along the width of the side of the container on its open edge, exposing the uppermost filter in a stack of flattened cone filters. In a preferred embodiment, an enlarged portion 52 is present above the slot 50 as a withdrawal gap or groove, enabling the filters, once snagged on the pick element, to be withdrawn. Note that the box of filters does not have to be opened to dispense a filter, and the limited accessibility of the filters in the container of the present invention keeps the filters dry and sanitary. The filters are removed one at a time by applying the grasping tool across the accessible surface of an exposed top filter (not shown) such that the pick element contacts the top filter at approximately a right angle, although other angles will demonstrate a degree of efficiency as well. The filters do not have to be handled and thus, the system promotes a germ-free operation.

This embodiment includes a plastic rectangular container measuring approximately 7⅞×5⅛×2⅝ inches. A slot 50 is formed in the container 30. It is approximately ⅜ inch wide and extends along the width of the box. The container comprises an enlarged portion 52 with the shape of its peripheral edge extending downwardly as a half circle beginning 2⅜ inch from the left side of the top and continuing its arc inward, so that it rejoins the slot upon completing its half circle arch, leaving approximately 1⅛ inch of slot to the opposite side from the origin of slot 50. This shape helps facilitate removal of filters from the container.

Figure 8:
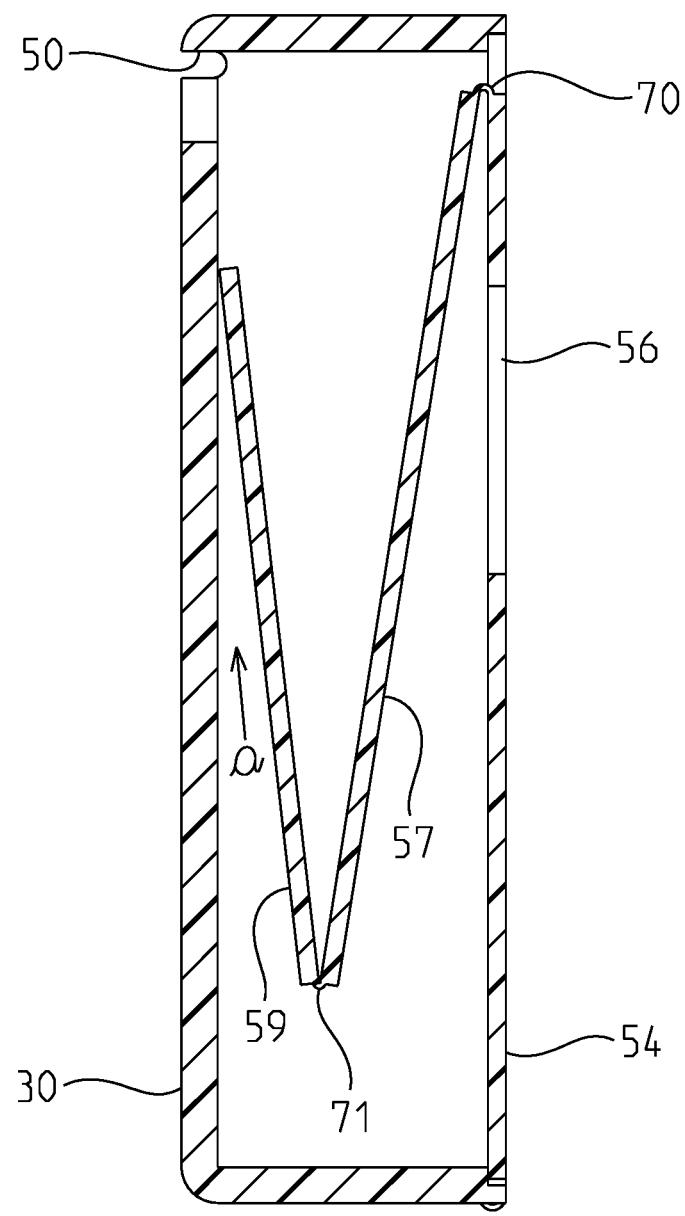
FIG. 8 is a cross section of the embodiment of FIG. 7 taken along lines 8-8 of FIG. 7.

Referring to FIG. 8, the back (bottom) 54 of the invention may include a cutout 56 rounded at the corners, which, in some embodiments, is approximately 3 inch wide by 2 inch high located approximately 1 inch from the topside. In those embodiments, this cutout may serve as a handle that may be grasped for carrying the container or removing its back accordingly. By inserting fingers and pulling outward, the back may open to reveal the inside of container 30, which allows for refilling bulk filters when depleted. In one embodiment, the entire back may be a monolithic piece that has two progress or arms 57, 59 that "accordion" and when viewed from the side resembles the shape of an N. Thus, as a result of living hinges 70, 71 connecting the arms to the sides of the container, the N structure is constantly urged toward the interior front (top) wall, as shown in FIG. 8. When fully loaded with filters at a, this embodiment is fully compressed to a tight configuration. As filters are removed, the arm continues to advance the filters upward toward the slot 50.

The slot 50 and the enlarged portion at the top serves two purposes: (i) the notch serves as a portal to insert the tip of the pick and (ii) secure a corner of a cone filter and with moderate pressure applied, extract filters one at a time through the slot.

Figure 14:
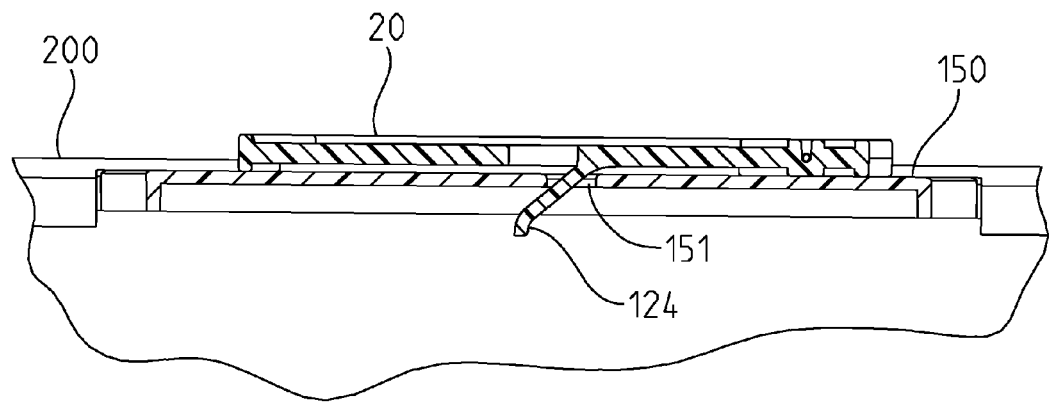
FIG. 14 is a cross section of the container of FIG. 10 taken along line 14-14.

A thin strip of metal, in some embodiments, about 5×2 inches, is affixed to the side by means of double sided adhesive (not shown), the outer side being clad in light covering or film for removal prior to use. The purpose of the metal strip is to attract and hold in place the pick, which is magnetized. In other embodiments, multiple strips are attached, and in preferred embodiments, the attachment sites are symmetrical, e.g., tongue 124 and cutout 151, as shown in FIGS. 14-15.

In one embodiment, a bore 38, depression, dimple or the like is formed in the thin strip of metal or on any other surface meant to receive the leg 28 of the pick 24, as shown for example in FIG. 1. The hole, depression, dimple or divot receives, with or without contact, the pick element. The pick may thus lie flat against the container in the stowed position protected from rough contact or accidental contact. In one embodiment the pick can be automated or lever operated such that upon sweeping across the filter stack, it separates a filter from the top of the stack.

Figure 9:
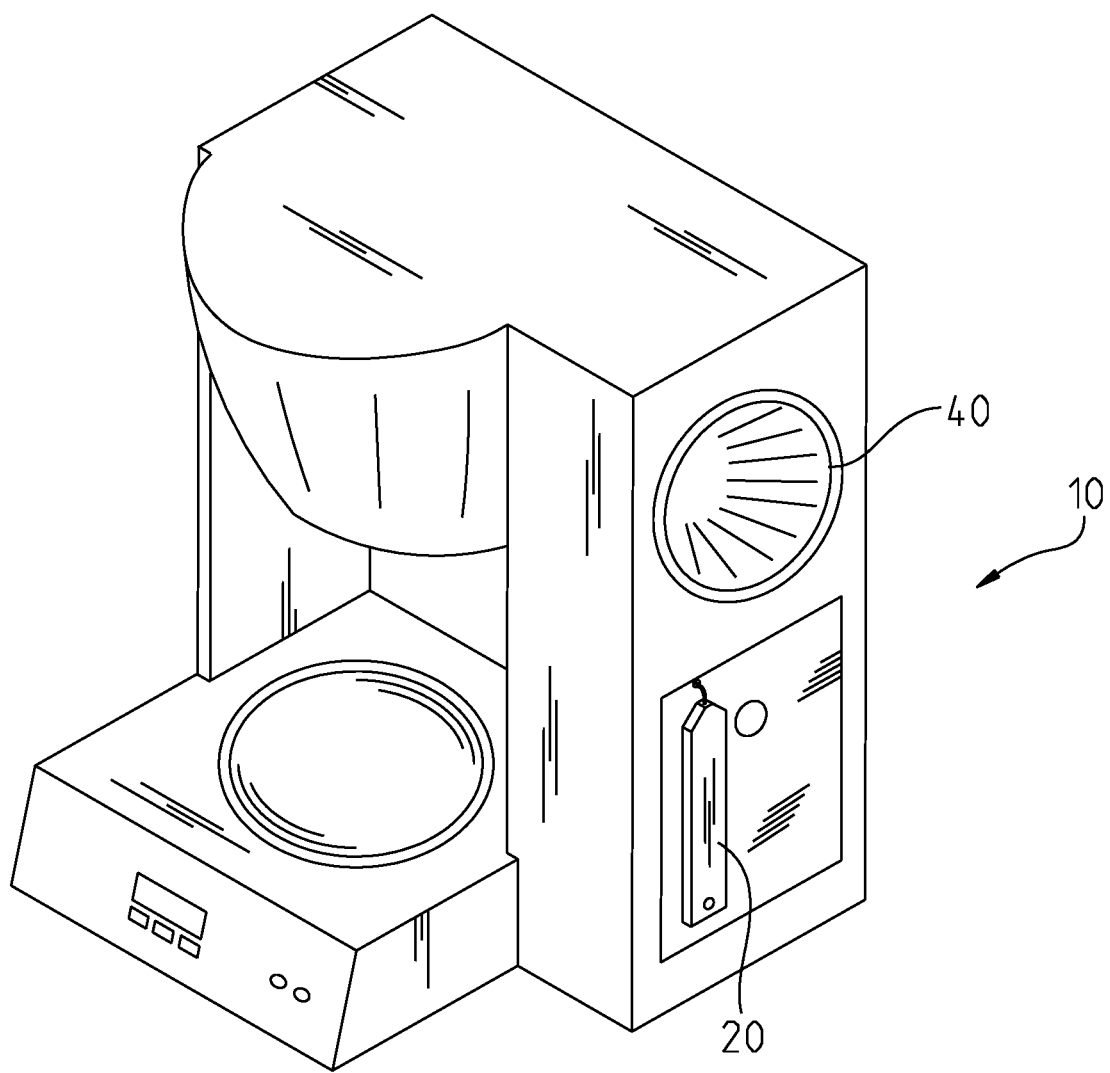
FIG. 9 shows an embodiment of the system shown schematically connected to a coffee maker.

At the time of this writing, the inventor contemplates manufacture of numerous embodiments and combinations of the container 30 and grasping tool 20, including those illustrated in the drawings, integrally formed with various models of coffee brewers for home or business use. FIG. 9 shows one such embodiment of the system built into an exemplary coffee brewing machine.

Referring to the embodiment of FIGS. 10-15, the container 30 includes opening 40. The opening has an edge 42. At least a portion of the edge (if the container and trim member are integrally cast) or an edge trim member is shaped so that bulk fibrous filters cannot pass freely through the opening in the container when contained therein, and so that at least a portion of a top filter (not shown) is accessible and graspable by the working end 24 of the grasping tool 20.

Figure 10:
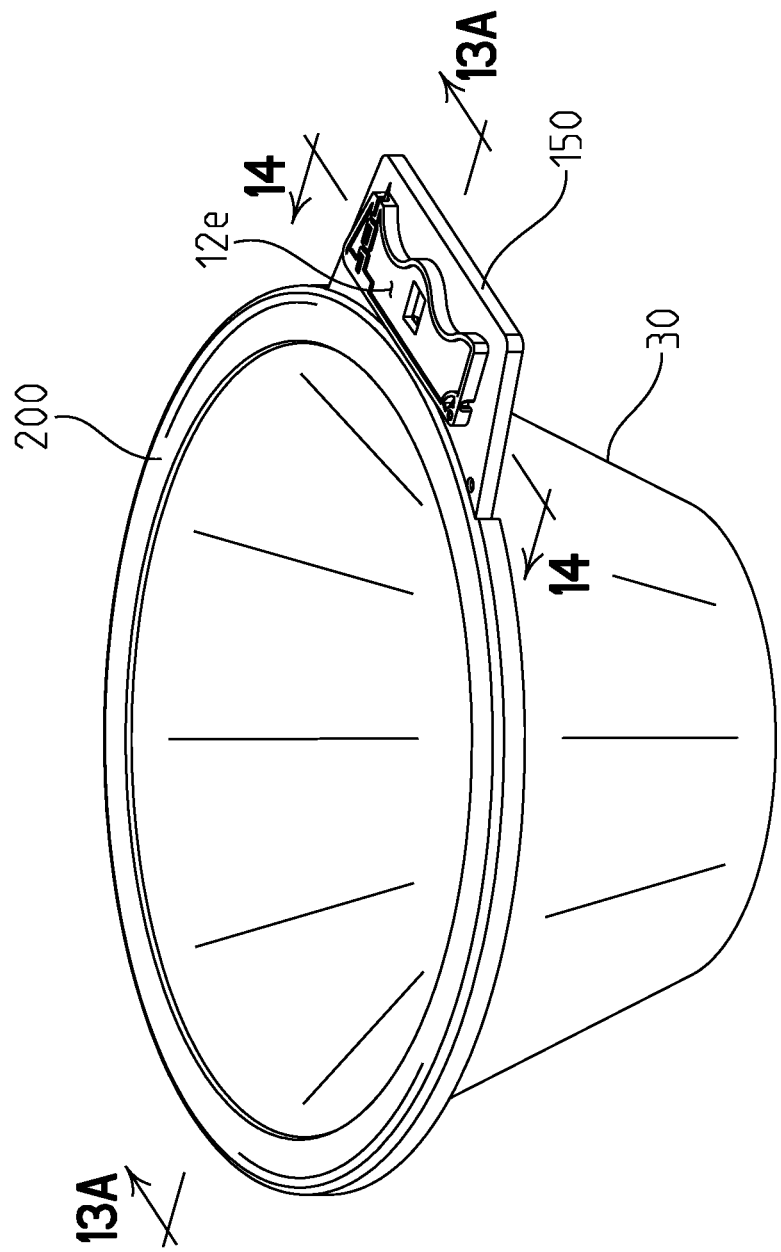
FIG. 10 shows an isometric view of an embodiment of the system.

In that embodiment, the edge trim member 46 has a downwardly extending wall 146 having a Z shaped cross section 147 and tab members 148 extending inward from the wall. The edge of the opening 40 of the container includes cutouts 142 for receiving the tab members 148. The tab members can pass freely through the cutouts so that the edge trim member 46 and the tab members 148 can rotate freely relative to the container 30 to define a locked position with the tab members underneath the edge 42 of the opening 40 so that the trim member 46 can be releasably secured to the container 30, as shown in FIG. 10. The edge trim member has a planer platform 150 for rotating the trim member relative to the container 30 so that a user can move the container and the trim member together as a single unit. Additionally, the planer platform includes a cutout 151 extending through it.

Figure 11:
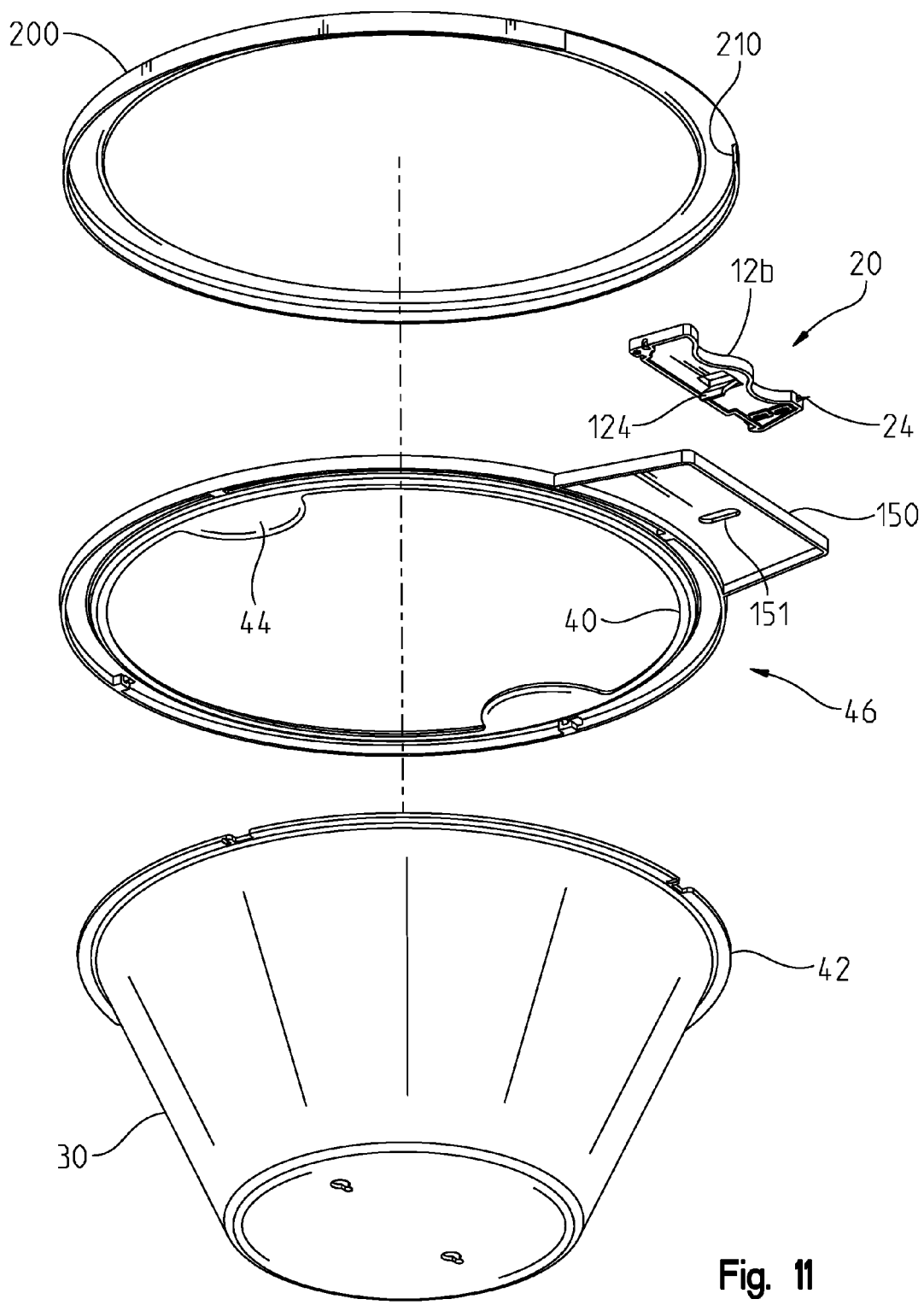
FIG. 11 is an exploded view of the embodiment of FIG. 10 showing the container, trim member and cover.
Figure 12:
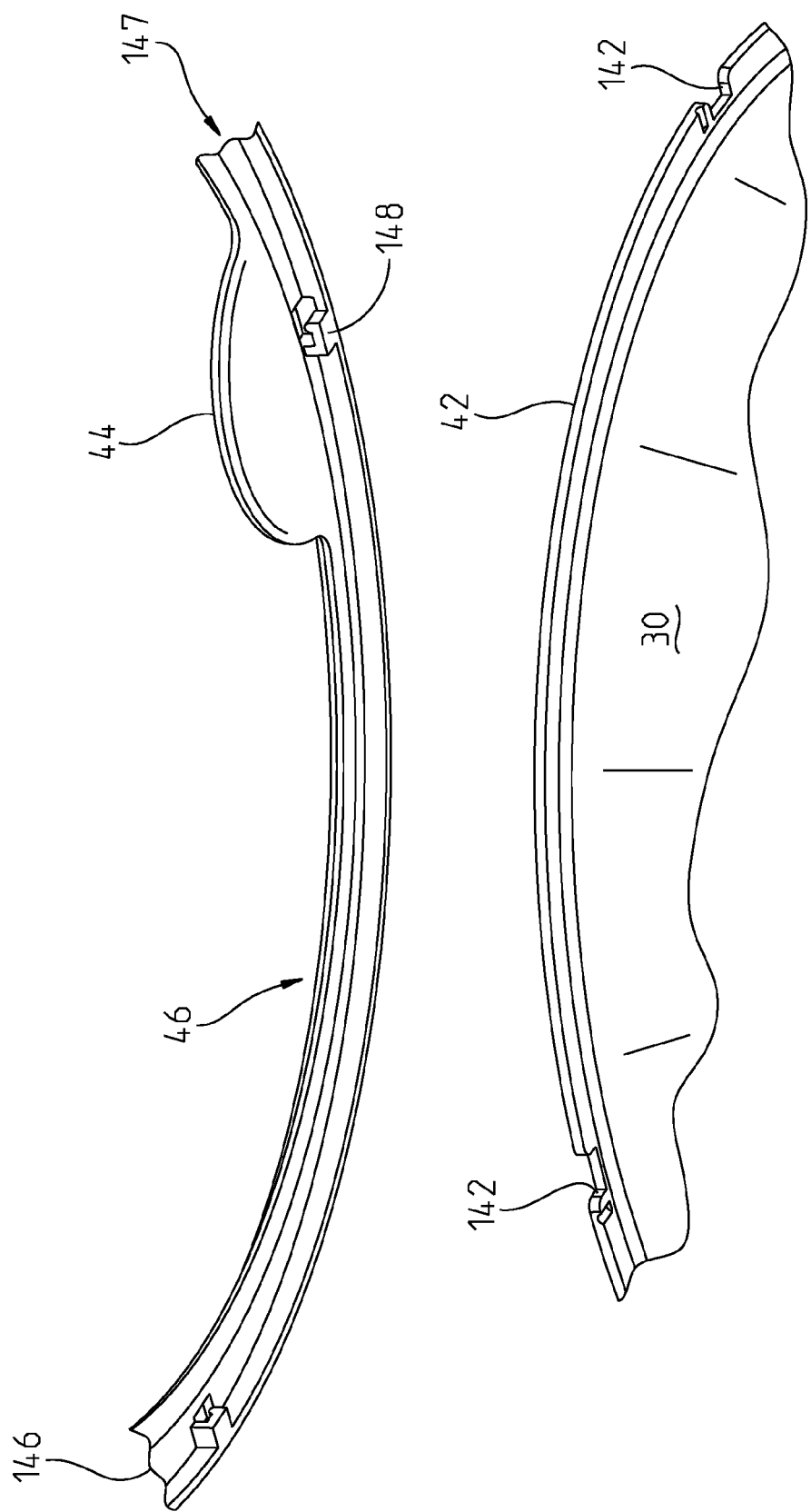
FIG. 12 is a partial cutaway of the edge of the container and a portion of the trim member shown enlarged to illustrate the tab members and cutouts.
Figures 13A, 13B:
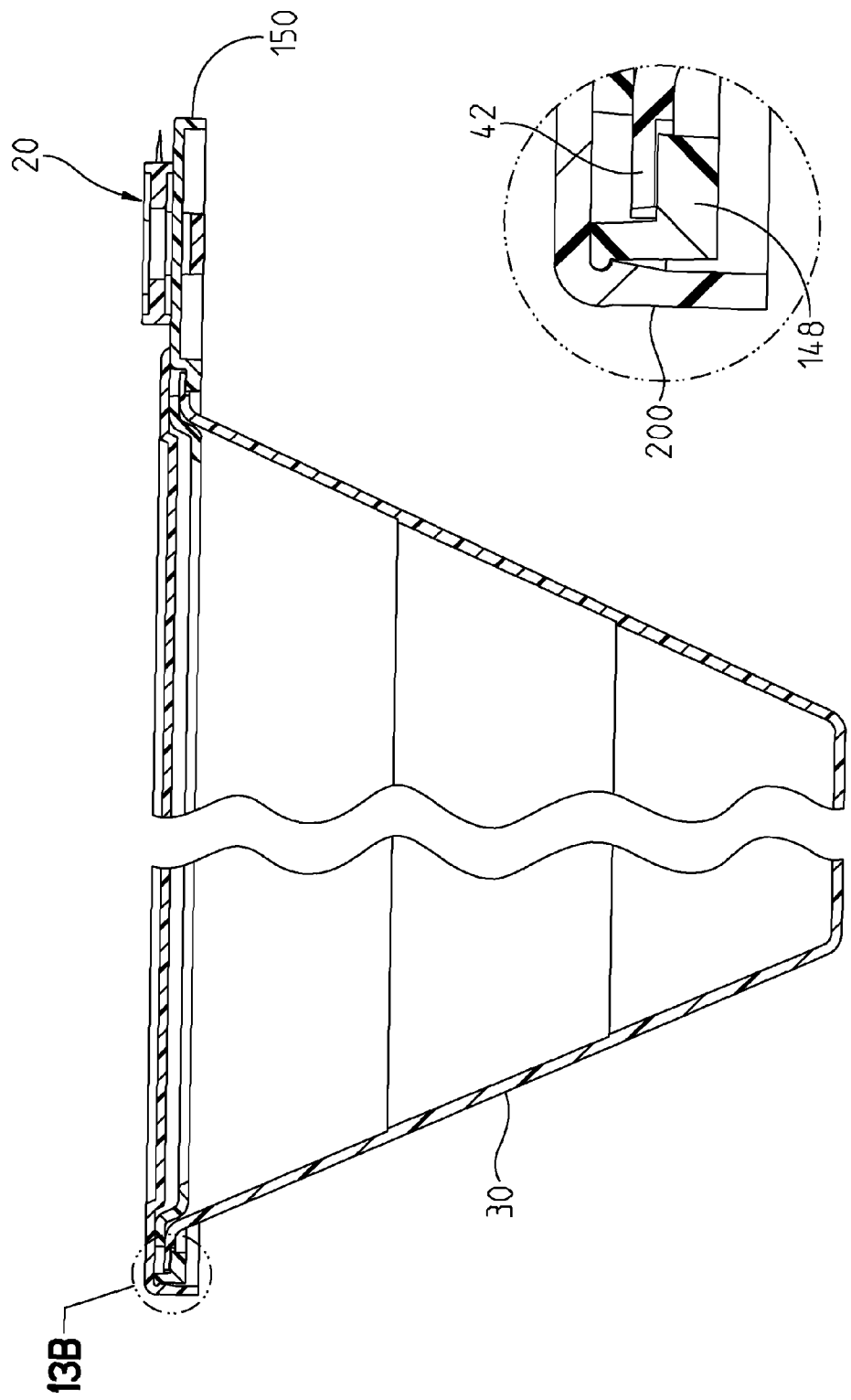
FIG. 13A is a cross section of the container of FIG. 10 taken along line 13A-13A.
FIG. 13B is an enlarged view of the encircled portion of FIG. 13A.

In the embodiment of FIGS. 10-15, a grasping tool 20 includes a handle 12 with a planer body 12*b* with a bore 12*c* having walls 12*d* formed therein. The body includes a top surface 12*e*, a bottom surface 12*f*, a front end 22 with pick 24 extending outwardly therefrom, a rear end 12*g* and an edge 12*h*. The edge 12*h* is preferably formed in the shape of repeating curves so that a user can easily grasp and separate the tool from the platform 150 of the trim member 46, as shown in FIGS. 11 and 14-15. The bore 12*c* in the handle of the tool has a tongue 124 that extends obliquely downward from one of the walls of the bore to provide resiliency to the tongue. This ensures the working tool does not become accidentally separated from the container and trim member 46.

Referring to FIGS. 10 thru 13A-13B, when the tongue 124 is securely positioned within the cutout 151, the tongue continuously urges the bottom surface 12*f* of the body of the handle against the top of the planer platform 150 so that a force is provided by the tongue that is distributed about the planer platform to maintain the grasping tool 20 on the platform 150. The system includes a cover 200 for covering the trim member and the container. In one embodiment, the cover has a cutout 210 in its edge so that the planer platform may extend laterally outward through the cutout when the cover is on the container and trim member, as shown in FIG. 10.

For the purposes of promoting an understanding of the principles of the invention, specific embodiments have been described. It should nevertheless be understood that the description is intended to be illustrative and not restrictive in character, and that no limitation of the scope of the invention is intended. Any alterations and further modifications in the described components, elements, processes, or devices, and any further applications of the principles of the invention as described herein, are contemplated as would normally occur to one skilled in the art to which the invention relates.

What is claimed is:

1. A system for singly dispensing fibrous filters from bulk comprising:

a grasping tool comprising: a working end; a handle; and
a pick that extends outwardly from said working end;

a container for containing bulk fibrous filters of a predetermined size, said container comprising: an opening; and a peripheral edge extending downwardly from said opening, at least a portion of the peripheral edge being shaped so that the bulk fibrous filters cannot pass freely through the opening when contained therein, and so that at least a portion of a top filter is accessible and graspable by the working end of the grasping tool;

a retainer base connected to the container for retaining the grasping tool, said retainer base comprising: a bottom; three upstanding sidewalls; a post extending upward from the bottom; and at least two oppositely disposed recesses in the sidewalls to facilitate removal of the grasping tool; and a bore in said grasping tool for receiving the post.

2. The system of claim 1, wherein the container further comprises at least one tab that extends from the peripheral edge toward the interior of the opening.

3. The system of claim 1, wherein the container further comprises a bore formed therein for receiving a leg of the pick so that the handle can lie flat against the container in a stowed position.

4. A system according to claim 1 further comprising biasing means operatively configured inside the container for continuously biasing cone-type fibrous filters in a direction toward the slot.

5. The system of claim 4, wherein a portion of the grasping tool handle or a portion of the container is magnetic so that the handle can be magnetically and releasably connected to the container, and wherein the container further comprises a bore formed therein for receiving a leg of the pick so that the handle can lie flat against the container in a stowed position.

6. The system of claim 1, wherein the retainer base is integrally formed with the container.

7. The system of claim 1, wherein the container and the retainer base are integrally formed with a coffee brewer machine.

8. A system for singly dispensing fibrous filters from bulk comprising:

a grasping tool comprising: a working end; a handle; and a pick that extends outwardly from said working end;

a container for containing bulk fibrous filters of a first size, said container comprising: a top portion; an opening in the top portion; a peripheral edge extending downwardly from said opening, at least a portion of the peripheral edge being shaped so that the bulk fibrous filters cannot pass freely through the opening when contained therein, and so that at least a portion of a top filter is accessible and graspable by the working end of the grasping tool; a bottom portion; and a means for releasably connecting the top portion to the bottom portion;

a retainer base connected to the container for retaining the grasping tool, said retainer base comprising: a bottom; three upstanding sidewalls; a post extending upward from the bottom; and at least two oppositely disposed recesses in the sidewalls to facilitate removal of the grasping tool; and a cup for containing bulk fibrous filters of a second size, wherein the second size is smaller than said first size, and said cup is adapted to fit within the container in a manner such that it does not move when the top portion and bottom portion are releasably connected, wherein: a bore is included in said grasping tool for receiving the post.

9. The system of claim 8, wherein said cup comprises an outwardly extending lip that fits concentrically and securely within the peripheral edge, and the top portion further comprises at least one tab that extends from the peripheral edge toward the interior of the opening.

10. The system of claim 8, wherein the grasping tool further comprises a tongue extending from the handle, and the bottom portion further comprises a notch in a sidewall for receiving the tongue.

11. The system of claim 8, wherein the bottom portion further comprises one or more holes extending through a bottom surface to facilitate mounting and storage of the system.

* * * * *